UNITED STATES PATENT OFFICE.

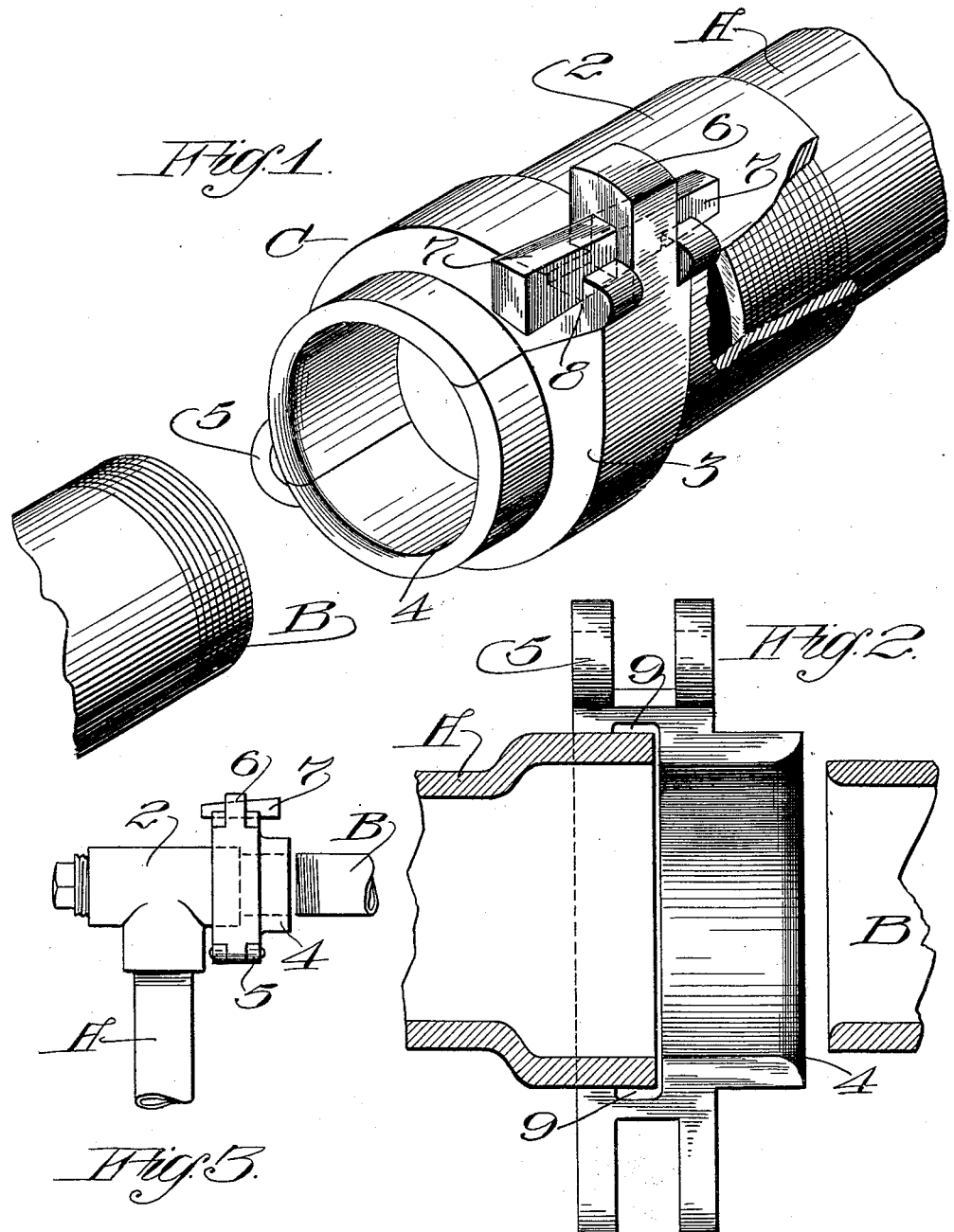

JAMES OGG, OF PAHALA, TERRITORY OF HAWAII.

PIPE-FITTING TOOL.

1,065,387. Specification of Letters Patent. Patented June 24, 1913.

Application filed January 4, 1912. Serial No. 669,448.

*To all whom it may concern:*

Be it known that I, JAMES OGG, a subject of the King of England, residing at Pahala, in the district of Kau and Territory of Hawaii, have invented new and useful Improvements in Pipe-Fitting Tools, of which the following is a specification.

This invention relates to pipe fitters' tools and pertains especially to a clamp and guide to be used by pipe fitters and erectors to enable one end of a pipe to be readily screwed into an elbow, T, or coupling, especially in working in cramped or narrow places; or where working with very heavy pipe and doing away with or assisting the helper.

The invention consists of the parts and the combination and construction of parts as hereinafter more fully described and claimed, having reference to the accompanying drawings, in which—

Figure 1 is a perspective of the invention showing its application to a plain union or coupling. Fig. 2 is a longitudinal section showing the device applied to a Durham fitting. Fig. 3 illustrates its application to a T, or elbow coupling.

A represents the end of a pipe which has already been placed in position and on the end of which an elbow, T, or union 2 as here shown, has been fitted.

B represents the pipe which is to be screwed into the coupling 2 in continuation of the pipe A.

The present invention consists of a combined clamp and guide C having a clamp portion 3 whose interior diameter is of the same, or a little less than the outside diameter of the coupling 2 and which clamp portion 3 is adapted to be clamped over the end of the coupling 2; the device having a smooth-bore, cylindrical extension 4 of substantially the same as, or a trifle larger interior diameter than the interior diameter of the coupling 2, and into which extension the pipe B is adapted to telescope and to be supported in axial line with the coupling 2.

Preferably the device C is made in two sections hinged together at 5 with suitable means for locking the sections together, as a perforated lug 6 on one section fitting a slot in the other section, and a key 7 fitting the perforation in the lug behind a suitable seat 8, on the slotted section.

The device is readily applicable to any form of coupling or union, and by the term "coupling," as hereinafter used in the claim, I mean a T, elbow, Durham, or any other type of union or fitting adapted to receive an end of a pipe.

In practice the clamp portion 3, or portion of larger diameter of the pipe guide is clamped or otherwise suitably secured on the end of the coupling into which a pipe section is to be screwed; the smooth-bore guide portion 4 of smaller diameter over-hanging and projecting beyond the end of the coupling as illustrated for instance in Fig. 2, forming a socket into which the pipe section B can be slipped and then easily guided into engagement with the threads of the coupling. When the two sections of pipe are suitably assembled, the clamp is removed, placed on the outer end of pipe B, or the coupling which goes on the end of pipe B, and the process continued until a suitable length of pipe has been assembled.

The interior of the clamp portion 3 is provided with an annular groove with pockets 9 to receive a packing in case the tool does not otherwise fit sufficiently snug on the coupling.

The annular groove 9 also provides a space adjacent the position occupied by the outer end of a pipe, when the device is in use, thereby leaving a space so that roughness or beads of metal on the end of the pipe do not interfere with the true alining or operation of the device.

Having thus described my invention what I claim and desire to secure by Letters Patent is—

A pipe fitting tool for use in joining pipes comprising, two semi-cylindrical sections hinged together, said sections being provided with a clamping face adapted to fit the flange of a pipe, a guiding portion adapted to guide the end of a pipe into the said flange, an annular shoulder formed upon said sections between said clamping face and said guiding portion and an annular groove adjacent said shoulder and said clamping face, the outer end of said clamping portion being beveled outwardly, and locking means for clamping said clamping face upon a pipe flange.

In testimony whereof I have hereunto set my hand in the presence of two subscribing witnesses.

JAMES OGG.

Witnesses:
HENRY GLASS,
EDWARD TODD.

---

Copies of this patent may be obtained for five cents each, by addressing the "Commissioner of Patents, Washington, D. C."